United States Patent [19]

Dell-Imagine

[11] Patent Number: 5,043,737
[45] Date of Patent: Aug. 27, 1991

[54] PRECISION SATELLITE TRACKING SYSTEM

[75] Inventor: Robert A. Dell-Imagine, Orange, Calif.

[73] Assignee: Hughes Aircraft Company, Los Angeles, Calif.

[21] Appl. No.: 533,330

[22] Filed: Jun. 5, 1990

[51] Int. Cl.$^5$ ............................................. H04B 7/185
[52] U.S. Cl. .................................... 342/358; 342/352; 342/354; 342/359
[58] Field of Search ............... 342/352, 354, 358, 359; 455/12

[56] References Cited

U.S. PATENT DOCUMENTS

| | | | |
|---|---|---|---|
| 4,156,241 | 5/1979 | Mobley et al. | 342/352 |
| 4,310,884 | 1/1982 | Roberts et al. | 342/352 |
| 4,355,313 | 10/1982 | Hubert | 342/352 |
| 4,358,767 | 11/1982 | Boireau | 342/352 |
| 4,675,680 | 6/1987 | Mori | 342/352 |
| 4,687,161 | 8/1987 | Plescia et al. | 342/358 |
| 4,883,244 | 11/1989 | Challoner et al. | 342/354 |
| 4,910,524 | 3/1990 | Young et al. | 342/354 |

OTHER PUBLICATIONS

"An Improved Step-Track Algorithm for Tracking Geosynchronous Satellites", M. Richiaria, International Journal of Satellite Communications, vol. 4, pp. 147–156 (1986).

Primary Examiner—Thomas H. Tarcza
Assistant Examiner—David Cain
Attorney, Agent, or Firm—Wanda K. Denson-Low

[57] ABSTRACT

A precision satellite tracking system incorporating a novel smoothing processor. The satellite tracking system estimates an angle between an antenna boresight and a desired line of sight to a moving satellite. The smoothing processor receives a sequence of pointing error measurements and using a Taylor series mathematical model of the satellite motion, the processor utilizes the sequence of measurements to generate the coefficients of the Taylor series model. The processor then executes a sequential, discounted least mean square algorithm to estimate the satellite's angular position, velocity, and acceleration as a function of time. Based on these estimates, the processor determines incremental adjustments to azimuth and elevation pointing angles of the antenna to maintain the center of an antenna beam on the moving satellite. The information is used in a program track mode to continually update the pointing of the antenna beam during the measurement process. The satellite tracking system provides continuous tracking of the antenna, which minimizes the instantaneous error between the reported direction of the line of sight and the actual direction to the satellite.

13 Claims, 3 Drawing Sheets

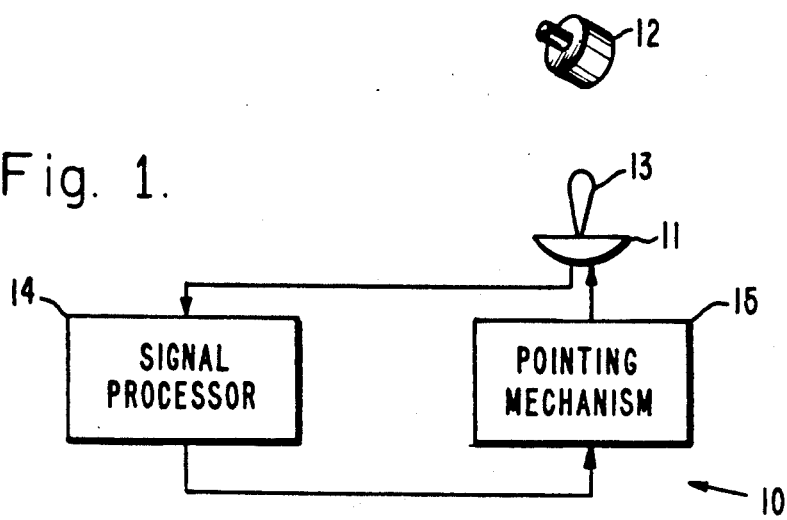
Fig. 1.
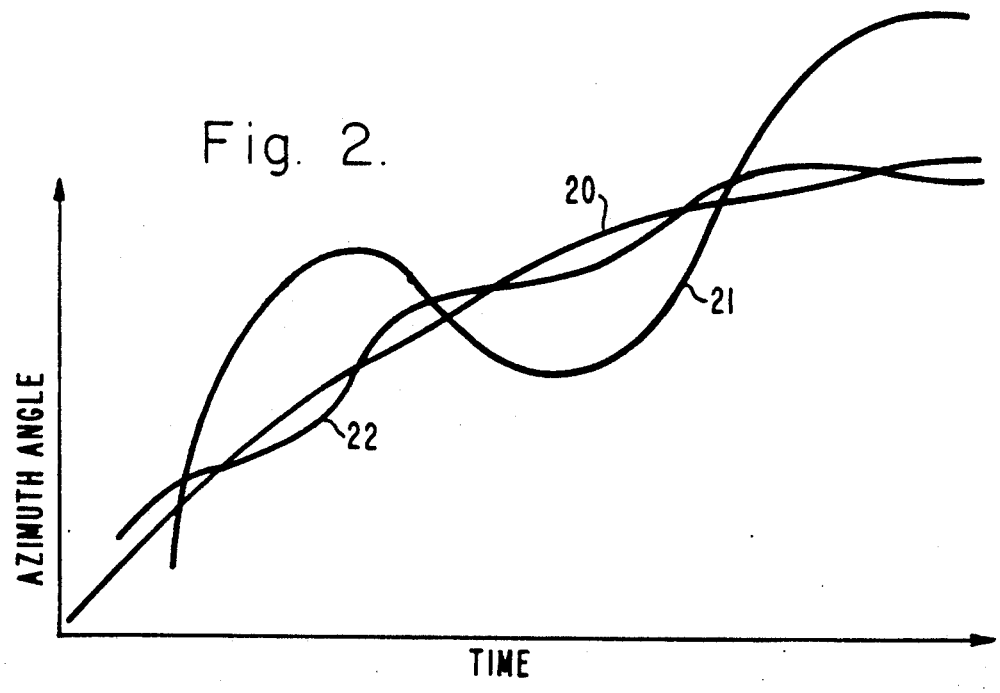
Fig. 2.
Fig. 3.
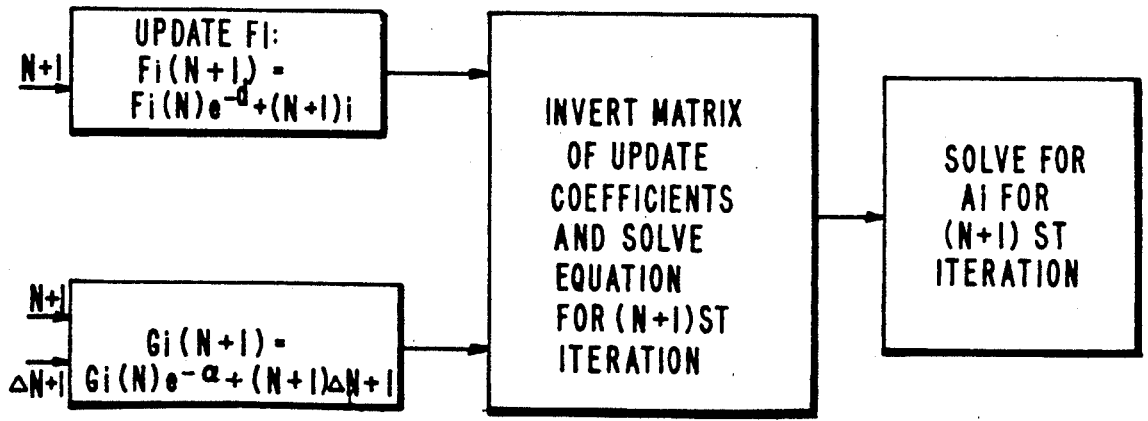

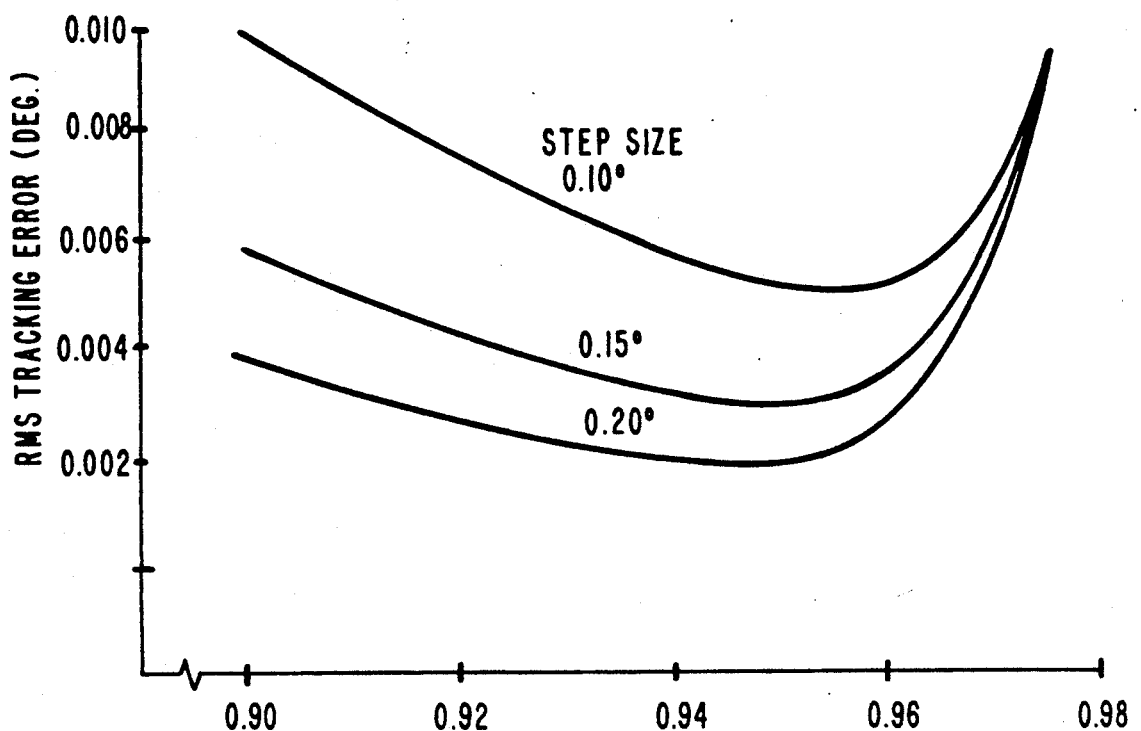
Fig. 4.
Fig. 5.
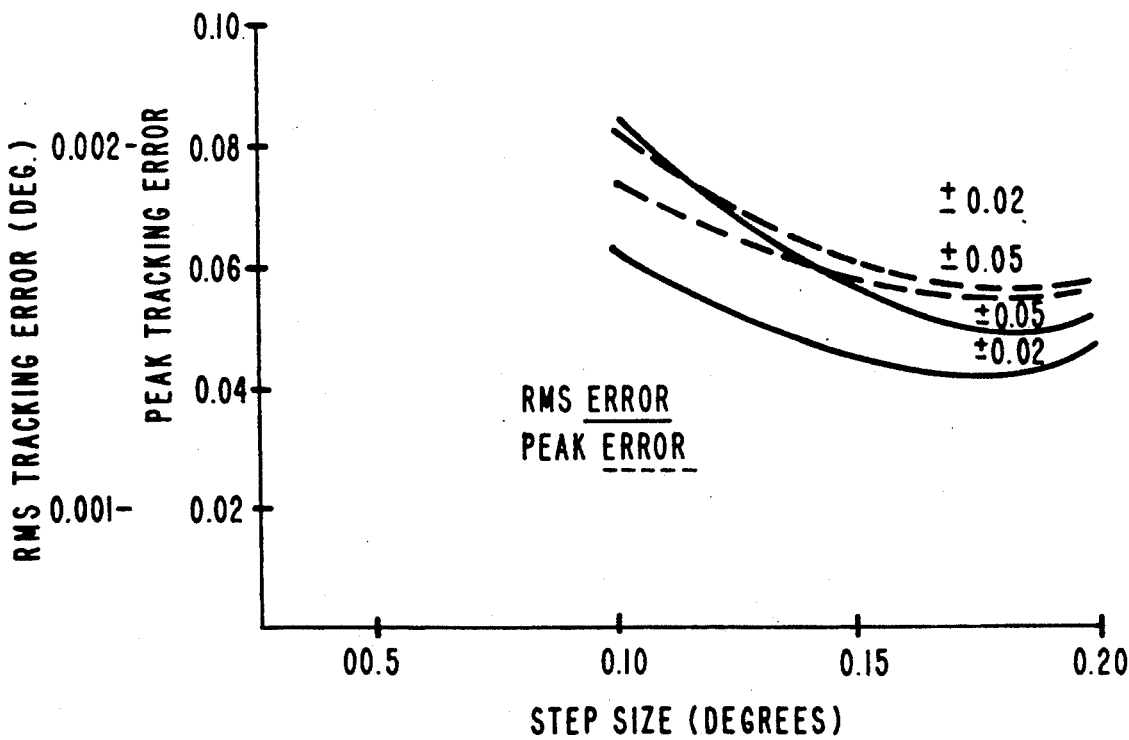

PRECISION SATELLITE TRACKING SYSTEM

BACKGROUND

The present invention relates to precision measurement of satellite location and, more particularly, to a method for adapting to or estimating the effects of satellite motion.

Conventional systems used to measure the precise location of a satellite employ a receiving antenna having a narrow beam for receiving a signal from the satellite. The system measures the pointing error by some means, and then makes a correction. One method for measuring the pointing error is to use a monopulse tracking system or a pseudo monopulse system which has an antenna pattern having a sharp null. The pointing of the antenna is adjusted continually to try to keep the signal source in the null.

Another method for measuring the pointing error is to observe the amplitude modulation as a narrow beam antenna is conically scanned around the bearing to the satellite. When the signal amplitude is highest, the antenna is pointed at the satellite. When the amplitude decreases, the pointing error is increasing. In a step scan system, the angle between the antenna boresight and the line of sight vector may be determined by making four measurements around the best estimate of the line of sight. Given the best estimate of the line of sight to the satellite, the antenna is commanded to four points. The first step is up in elevation and to the right in azimuth, then up in elevation and to the left in azimuth, thirdly down in elevation and to the left in azimuth, and finally, down in elevation and to the right in azimuth. The received signal from the satellite is measured at each of these four positions. The four measurements taken at these four positions are combined to provide the measured azimuth and elevation error between the estimated line of sight and the true line of sight.

The current state of the art for steering antennas to point at a slowly moving satellite utilizes sequential comparison of amplitude between two points without employing any smoothing. The antenna is sequentially moved in the direction of increasing signal strength. This method is described in a technical paper entitled "An Improved Step-Track Algorithm for Tracking Geosynchronous Satellites" by M. Richharia in the *International Journal of Satellite Communications*, Vol. 4, pages 147-156 (1986).

Regardless of which type of measurement system is used, the distinguishing feature is that in conventional systems, the antenna is moved directly in response to a measurement. That is, the error is measured by some means or another, and then the error is corrected by moving the antenna by the amount necessary to correct the error. No smoothing is employed.

The problem is that the satellite is moving. Making the measurement, and moving the antenna thereafter in response to the measurement, takes a finite amount of time. By the time the process is completed, the satellite has moved. Thus, there is always an error. If the satellite were still, that is, not moving, after a number of measurements over a period of time, the pointing error can be made arbitrarily small. However, because the satellite is moving while the measurements are being made and the corrective movements of the antenna are being made, the error can only be resolved to about 1/10 of the beam width of the antenna. Sometimes the error can be made as small as 1/10 of a degree.

There is a need to have measurements as accurate as 1/100 of a degree to be used for making an ephemeris. Accordingly, it is an objective of the present invention to provide a precision satellite tracking system that can resolve satellite error to be in the order of hundredths of a degree.

SUMMARY OF THE INVENTION

In accordance with this and other objectives and features of the invention, there is provided a method for tracking a satellite that employs a Taylor series mathematical model of the satellite motion. The error measurements are still made by the prior conventional methods. However, in accordance with the principles of the present invention, the measurements of the instantaneous errors are recursively added to the mathematical model. The tracking system of the present invention comprises two parts: a means of estimating the angle between the antenna boresight and the line of sight to the satellite; and a processor which takes the sequence of measurements, averages them to report an estimated angular position, velocity, and acceleration, and which uses this information in a program track mode to continually update the pointing of the beam during measurement. The error referred to as the instantaneous error is not measured in an instant, but instead represents an average condition over an interval. The measurements are then smoothed using long-term smoothing. The mathematical model is continually updated as the measurements are being made. The mathematical model is in the form of a three term Taylor series of azimuth and elevation. The azimuth series takes the form:

$$az(t) = az(0) + \omega(0)t + \bar{\omega}(0)\frac{t^2}{2}$$

Thus, it includes the angular velocity and the acceleration (first and second derivative). Other terms following the third term are ignored. Hence, the series used is only an approximation and must be updated. The elevation series is in the same form.

It will be seen that the mathematical model incorporates the satellite's angular position, angular velocity, and angular acceleration. The measurements existing heretofore are used to estimate these parameters. The measurements are fed into a digital processor which contains the mathematical model. The processor executes a sequential, discounted least mean square algorithm to estimate the satellite's angular position, velocity and acceleration as a function of time. Based on these estimates, the processor determines the incremental adjustments to the azimuth and elevation pointing angles of the tracking antenna to maintain the center of the step scan pattern on the moving satellite.

The coefficients of the Taylor series are the quantities that are changing in response to the measured data. Because of the use of this technique, the tracking system now measures satellite location to within a few hundredths of a degree. This improvement to existing tracking systems does not involve any changes in the mechanical or electrical configuration of the apparatus or hardware. It results from software or computer programming to provide smoothing of the three term series. Accordingly, the invention is in the nature of a method comprising a sequence of steps, or the computer implementation of a software algorithm.

The old measurements are discounted as new measurements are made. How soon old measurements are discounted depends on how long it takes to make the measurements, how long it takes to do the smoothing, and how rapidly the satellite is moving. The present invention may be considered to be a technique for increasing the length of the smoothing time in order to decrease the error. This involves incorporating in the smoothing algorithm a means of adapting to or estimating the effects of satellite motion. The method of the present invention basically employs a least mean square fit. In a sense, it is a form of statistical regression analysis.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a block diagram of a satellite tracking system having a steerable antenna which is used to measure the precise location of a satellite;

FIG. 2 is a curve illustrating the reduction in error made in measuring satellite position when employing the principles of the present invention;

FIG. 3 is a block diagram showing an iterative solution of a least mean square estimator;

FIG. 4 is a graph showing the effect of step size on the smoothing algorithm of the present invention;

FIGS. 5 and 6 are graphs showing effects of changing step size versus a desired carrier to noise spectral density ratio on tracking error.

DETAILED DESCRIPTION

Figure 6:
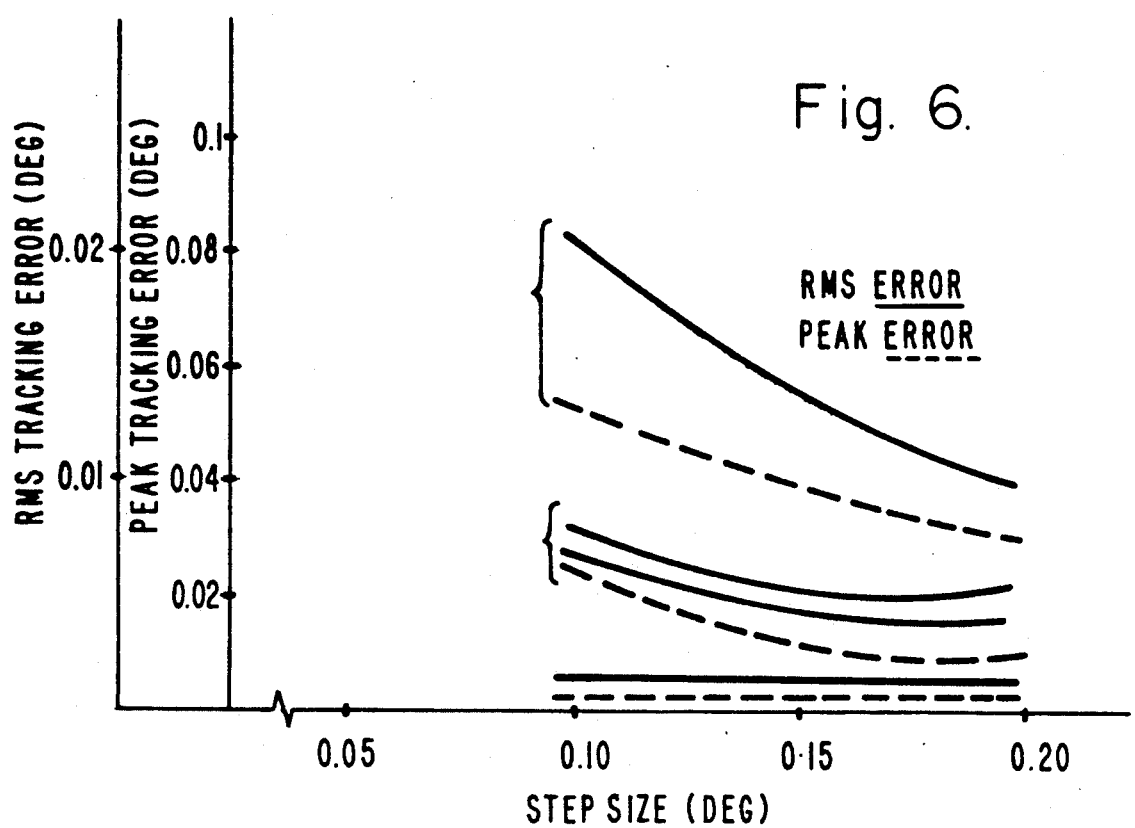

Referring now to the drawings, FIG. 1 is a block diagram of a satellite tracking system 10 having a steerable antenna 11 which is used to make approximate measurements of the location of a satellite 12. The antenna 11 has a narrow antenna beam 13 for receiving a signal from the satellite 12. The signal is coupled to a signal processor 14 which measures the error and develops a steering command signal that is applied to a steering mechanism 15. The antenna 11 is then commanded to a correct position by the steering mechanism 15.

In conventional satellite tracking systems 10, the approximate pointing error is measured and then the correction is made. In conventional systems 10, the antenna 11 is moved directly in response to the measurement. No smoothing is employed. That is, the antenna 11 is sequentially moved in the direction of increasing signal strength. If the satellite 12 were not moving, the antenna 11 could ultimately be pointed exactly at the satellite 12. However, because the satellite 12 is moving while the measurements are being made and while the antenna 11 is being steered to a new pointing direction, the location of the satellite 12 can only be measured to an accuracy of about 1/10 of a degree.

Referring now to FIG. 2, there is shown a graph of a curve illustrating errors made in measuring azimuth angle of a satellite 12. Time is along the abscissa and azimuth angle is along the ordinate. The satellite 12 is moving with time along an actual azimuth angle 20 which appears as a smooth curve in the graph of FIG. 2. A first measured azimuth angle 21 varies widely around the actual azimuth angle 20 and is illustrated in FIG. 2 as a curve oscillating around the curve of the actual azimuth angle 20. The first measured azimuth angle 21 represents the measurements of the location of the satellite 12 made by moving the antenna 11 directly in response to a measurement without employing smoothing. The error shown in FIG. 2 represents 1/10 of a degree error between the actual azimuth angle 20 and the first measured azimuth angle 21.

A second measured azimuth angle 22 tracks much more closely with the actual azimuth angle 20. It is also shown as a curve oscillating about the curve of the actual azimuth angle 20. However, the error is much smaller, and as shown in FIG. 2, the error represents 1/100 of a degree. The second measured azimuth angle 22 represents the measurements of the location of the satellite 12 made by employing the principles of the present invention as will be described below.

In accordance with the principles of the present invention, the software or computer program of the signal processor 14 in the satellite tracking system 10 of FIG. 1 is modified to incorporate a Taylor series mathematical model of the motion of the satellite 12. This mathematical model includes the coefficients for angular position, angular velocity and angular acceleration. The signal processor 14 uses the same measurements as were used heretofore in conventional systems to estimate the parameters of the mathematical model. These conventional measurements are also used by the signal processor 14 to execute a sequential, discounted least mean square algorithm to estimate as a function of time the angular position, velocity and acceleration of the satellite 12. Based on these estimates with time, the signal processor 14 determines the incremental adjustment to the azimuth and elevation pointing angles of the antenna 11 to maintain the center of the beam 13 pointed at the moving satellite 12.

The old measurements are discounted as new measurements are made. How soon old measurements are discounted depends on how long it takes to make the measurements, how long it takes to do the smoothing, and how rapidly the satellite 12 is moving. The present invention may be considered to be a technique for increasing the length of the smoothing time in order to decrease the error. Thus, the invention provides a way of adapting to or estimating the effects of the motion of the satellite 12. The invention basically employs a least mean square fit and may be considered to be, in a sense, a form of statistical regression analysis.

The present invention permits smoothed measurement to 1/100 of a degree to provide data sufficiently accurate for use in the preparation of an ephemeris. The invention permits this improved measurement and tracking accuracy (i.e. smaller pointing errors) because the averaging interval is much longer than is allowable in the conventional measurement methods. The increase in the averaging interval is permitted because the tracking algorithm allows angular motions of the satellite 12 which are large compared to the angular size of the antenna beam 13.

In operation, the antenna 11 receives radio frequency signals transmitted toward it from the satellite 12 and provides output signals indicative of the amplitude of the received radio frequency signals. The antenna 11 receives the signals from the satellite 12 by tracking the satellite 12 in step-scan, conical scan, pseudo-monopulse, or monopulse modes, or an appropriate combination thereof, depending upon the application. For example, in a step scan measurement, the antenna 11 continuously provides a sequence of measurements comprising four signals m1, m2, m3, m4 to the signal processor 14 that are used to estimate the angle between the boresight of the antenna 11 and the line of sight to the satellite 12. The signal processor 14 takes the sequence of measurements, averages them to arrive at an estimated angular position, velocity, and acceleration, and uses this information in a program track mode to continually update the pointing of the antenna beam 13 during the measurement. This continuous update process is particularly important when the movement of the satellite 12 during the measurement is comparable to, or larger than, the error of the measurement itself.

The sequence of angular measurements is begun by acquiring an initial best estimate of the line of sight to the satellite 12 by using a conventional step track algorithm. Again, using a step scan measurement technique as a concrete example, given the estimated line of sight to the satellite 12, the antenna 11 is commanded to step to four points around the estimated line of sight. In the conventional step track algorithm, the antenna 11 is commanded to step up in elevation and to the right in azimuth, then up in elevation and to the left in azimuth, thirdly, down in elevation and to the left in azimuth and finally down in elevation and to the right in azimuth. The received signal from the downlink is measured at each of these four positions, and will be identified hereinafter as measurement signals m1, m2, m3, m4, respectively. Given the typically large inertia of the antenna 11, it is usually necessary to let the antenna 11 dwell for several seconds at each of these four positions and to allow a small amount of time for transit between these positions. The four measurements taken at these four positions are combined in the signal processor 14 to provide the measured azimuth and elevation error between the estimated line of sight and the true line of sight. The sequence of four measurements may require substantially one minute, with an allocation of substantially ten seconds per measurement and substantially five seconds for transit between measurements.

The mathematical equations for determining the estimated azimuth and elevation errors are as follows.

$\Delta Az = \{[m1+m4-(m2+m3)]/(S\theta_s\ 2.772)\}$, and $\Delta El = \{[m1+m2-(m3+m4)]/(S\theta_s\ 2.772)\}$, where $S=m1+m2+m3+m4$, and where $\theta_s$ is the size of the step in azimuth and elevation. The beam shape is assumed to be Gaussian, and is given by the equation: $E(\psi)=e^{-1.386\psi^2/(BW)^2}$ where BW is the two-sided 3 dB beamwidth.

These formulas are derived by substituting the following expression for $\psi^2$ in the Gaussian electric field function: $\psi^2=(\Delta Az\pm\theta_s)^2+(\Delta El\pm\theta_s)^2$. After expanding the square term in the exponents of m1, m2, m3, and m4, and cancelling the common terms in the normalized sum, the two sums are proportional to the hyperbolic tangent of the following factor: $2.772\Delta\theta_s/(BW)^2$. Since the hyperbolic tangent of an argument is equal to the argument itself, an approximation of the pointing error is obtained by dividing the normalized sums by the factor: $2.772\theta_s/(BW)^2$. Given the determination of the best estimate of the azimuth and elevation position of the satellite 12 during the interval in which the four measurements are made, the estimated positions are processed within the signal processor 14 which executes a sequential, discounted least mean square algorithm to estimate the angular position, velocity and acceleration of the satellite 12 as a function of time.

The smoothing algorithm for the N+1st measurement in a sequence of measurements for either the azimuth or the elevation error is based on minimizing the weighted sum of the previous errors $\Delta_n$:

$$WS = \sum_{n=1}^{N} [\Delta_n - a_0 - a_1 n - a_2 n^2]^2 e^{-\alpha(N-n)}$$

The derivative of the weighted sum with respect to the estimated parameters a0, a1, and a2 lead to the following conditions:

$$\frac{\partial(WS)}{\partial a_0} = -2 \sum_{n=1}^{N} [\Delta_n - a_0 - a_1 n - a_2 n^2] e^{-\alpha(N-n)} = 0$$

$$\frac{\partial(WS)}{\partial a_1} = -2 \sum_{n=1}^{N} n[\Delta_n - a_0 - a_1 n - a_2 n^2] e^{-\alpha(N-n)} = 0$$

$$\frac{\partial(WS)}{\partial a_2} = -2 \sum_{n=1}^{N} n^2[\Delta_n - a_0 - a_1 n - a_2 n^2] e^{-\alpha(N-n)} = 0$$

These conditions lead to three simultaneous linear equations $$a_0 f_0 + a_1 f_1 + a_2 f_2 = g_0$$
$$a_0 f_1 + a_1 f_2 + a_2 f_3 = g_1$$
$$a_0 f_2 + a_1 f_3 + a_2 f_4 = g_2$$

where $$f_i = \sum_{n=1}^{N} n^i e^{-\alpha(N-n)} \quad i = 0, 1, 2, 3, 4$$

$$g_i = \sum_{n=1}^{N} n^i \Delta_n e^{-\alpha(N-n)} \quad i = 0, 1, 2$$

The solution to these simultaneous equations may be expressed in closed form as follows:

$$\begin{pmatrix} a_0 \\ a_1 \\ a_2 \end{pmatrix} = \begin{pmatrix} f_0 & f_1 & f_2 \\ f_1 & f_2 & f_3 \\ f_2 & f_3 & f_4 \end{pmatrix}^{-1} \begin{pmatrix} g_0 \\ g_1 \\ g_2 \end{pmatrix}$$

Given the factors $f_0$, $f_1$, $f_2$, $f_3$, $f_4$, $g_0$, $g_1$, and $g_2$ for N measurements, these factors may be updated for the N+1st measurement as follows:

$$f_i(N+1) = f_i(N) e^{-\alpha} + (N+1)^i \quad i=0,1,2,3,4$$

$$g_i(N+1) = g_i(N) e^{-\alpha} + (N+1)^i \Delta_{N+1} \quad i=0,1,2$$

The iterative solution of these simultaneous equations is shown in FIG. 3. The above discussion of smoothing applies directly to the case where the antenna 11 is stationary and the changes in the mean value of the measurements, which pass to the smoothing algorithm reflect only the motion of the satellite 12 and not the motion of the antenna 11. However, the whole purpose of the above procedure is to correct the position of the antenna 11, so as to minimize the mean square pointing error. If the errors are reported after the pointing reference is changed, the corrections reported to the smoothing algorithm will not have the uniform statistical properties assumed in the above derivation.

The preferred method of avoiding these conflicting requirements is to make the measurements with the antenna 11 pointing to the current best estimate of the line of sight. These measurements are the errors between the estimated and the actual line of sight direction. What is reported to the smoothing algorithm is the sum of these measured errors and the total correction in azimuth or elevation made to the pointing of the antenna 11 since the first measurement had been received by the smoothing algorithm. The result is that the measurements are reported to the smoothing algorithm as if the antenna 11 had not moved. With this modification to the reported measurements, they have the uniform statistical properties assumed in the above derivation.

The smoothed position of the satellite 12 as computed by the least mean square filter is equal to the best estimated total correction of the position of the antenna 11 beginning with the position of the antenna 11 at the time of the first measurement. The incremental change in the position of the antenna 11 between the Nth and (N+1)th measurements is the difference of the Kalman filter output at these two times.

Finally, the algorithm described above contains the exponential discount factor exponential $(-\alpha)$ as an unspecified parameter. This parameter is optimized for a particular satellite orbit and antenna system, depending on the angular velocity of the satellite 12 and the effects of random measurement errors as described above. As the discount factor approaches unity, the effective integration time becomes very long, and the algorithm does not adapt to changes in the best choice of parameters. If the discount factor is too small, the adaptation to changing parameters is very rapid, but there is a loss of accuracy due to random errors on the individual measurements. The optimization of this parameter requires an engineering analysis for each satellite 12, based on the signal to noise ratio of the downlink received signal, backlash errors in the steering mechanism 15, the variability of the downlink power, and the angular rates of the satellite 12 to be tracked.

After the transient effects in the smoothing function have died out, the estimated azimuth and elevation motions as determined by the three term series with coefficients $a_0$, $a_1$, and $a_2$, separate coefficients for both the estimated azimuth and elevation variations, are applied to the steering mechanism 15. These corrections are in addition to the initial four steps around the best estimate of the true line of sight. The result is that the measurements are made as if the satellite 12 were motionless during the four measurements.

A detailed simulation of the dynamics of the satellite tracking system 10 for following the motion of the satellite 12 in an inclined 24 hour orbit was constructed. The satellite 12 was modeled to have a circular, 24 hour orbit, and was inclined at an angle of 5 degrees to the equatorial plane. The antenna 11 of the tracking system 10 was assumed to have a 1 degree beamwidth. The antenna 11 was further assumed to dwell on each measurement point for 10 seconds and to use 5 seconds for transit between measurement points. Thus, for the first algorithm, a single pair of measurements, comparing right and center for example, requires 30 seconds, while in the second algorithm, a measurement of four points requires 60 seconds. The measurements are corrupted by the following effects: noise in the receiver, signal scintillation on the downlink, gear backlash in setting the position for each measurement, and the effects of satellite motion during each dwell.

The downlink signal is modelled as a Rician fading signal with Gaussian distributed in-phase and quadrature signals. The in-phase component has a mean value of 1, while the quadrature signal has a mean value of 0. These two Gaussian processes are given identical RMS values which are varied parametrically from 0 to 0.05. They are assumed to be exponentially correlated with a 1/e correlation time of 36 seconds. The receiver noise is taken as a zero mean, independent Gaussian sequence for a 1 second sampling rate. Because of the high signal to noise ratio assumed, the envelope is only affected by the in-phase noise, and the quadrature noise is ignored. The RMS value of the in-phase Gaussian noise is varied parametrically from 0.01 to 0.1. Finally, the backlash of the steering mechanism 15 was modelled. The setting of the steering mechanism 15 is assumed to have a uniformly distributed error of 0.02 degrees about the commanded position.

Referring now to FIG. 4, a graph is shown illustrating the optimization of the exponential discount factor in the smoothing algorithm, where Exponential Discount Factor is along the abscissa and RMS tracking error is along the ordinate. The conditions assumed for constructing the graph are a 30 dB carrier to noise spectral density ratio, ±2 percent RMS amplitude scintillation on the downlink, and gear backlash of ±0.02 degrees. The RMS tracking error shows a definite minimum at substantially 0.95. Due to the smoothing algorithm's tendances to break lock rapidly above 0.96, the selected design factor is chosen as 0.94. The effect of the step size on the accuracy of the tracking algorithm is shown. As the step size is increased a smaller pointing error results, but with a consequent increase in the pointing loss. The trend appears in the rapid increase of the RMS tracking error as the step size is decreased from 0.15 to 0.10 degrees. When the step size is further decreased to 0.05 degrees, the algorithm failed to maintain the track.

Referring now to FIG. 5, a graph is shown illustrating the optimization of the step size in the example step tracking system, where step size in degrees is along the abscissa, and RMS tracking error and peak tracking error in degrees are along the ordinate. The assumed conditions assumed for constructing the graph are a 20 dB carrier to noise spectral density ratio and gear backlash of ±0.02 degrees. The effect of changing the step size angle with the 20 dB carrier to noise spectral density ratio is shown with downlink amplitude scintillation values of 2 and 5 percent. The RMS error is the square root of the sum of the squares of the azimuth and elevation errors averaged over a 12 hour period, after an initial acquisition transient. The peak error is the largest tracking error during the twelve hour tracking period, again, after the initial acquisition transient.

FIG. 6, is a graph similar to FIG. 5 showing the optimization of the step size, where step size in degrees is along the abscissa, and RMS tracking error and peak tracking error in degrees are along the ordinate. The assumed conditions for constructing the graph are a 30 dB carrier to noise spectral density ratio and gear backlash of ±0.02 degrees, the effect of changing the step size angle with a 30 dB carrier to noise spectral density ratio, and the downlink amplitude scintillation values of 2 and 5 percent.

Figure 7:
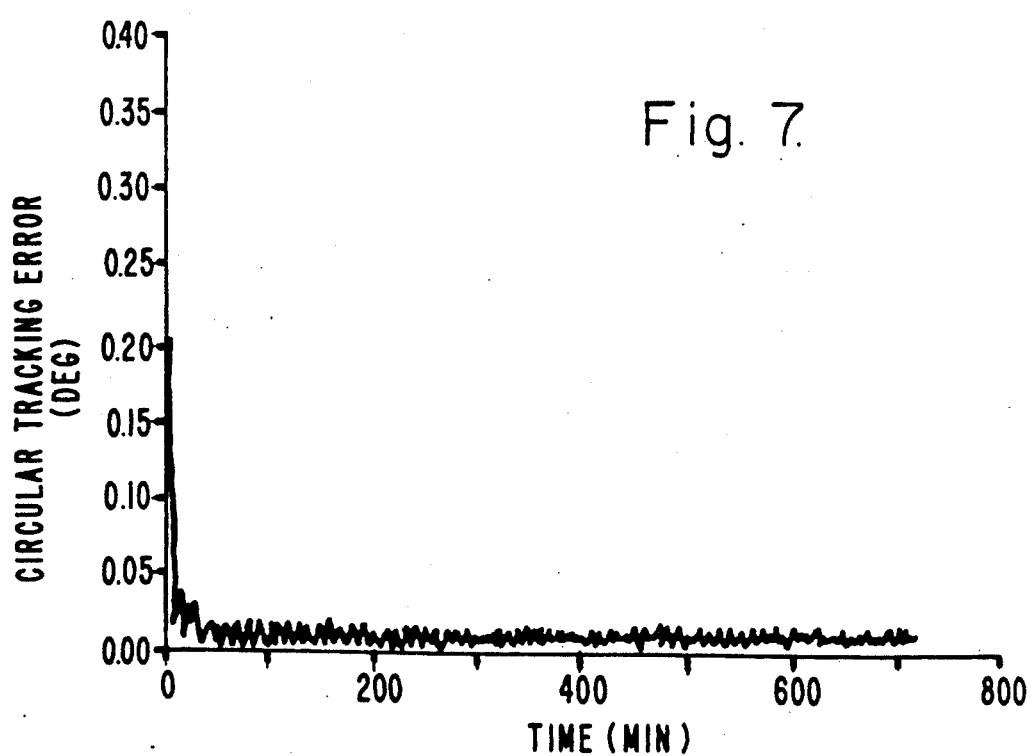
FIG. 7 is a graph showing circular tracking error versus time.

FIG. 7 is a graph showing circular tracking error versus time, where time in minutes is along the abscissa and circular tracking error in degrees is along the ordinate. The graph shows the square root of the sum of the squares of the azimuth and elevation error versus time, in minutes, over a 12 hour time period, which is substantially half of a complete satellite orbit. The data was computed with ±2 percent amplitude scintillation, 30 dB carrier to noise spectral density ratio, and a gear backlash of ±0.02 degrees. The steady state error varies between 0 and 0.02 degrees, as one would expect with a uniformly distributed backlash of ±0.02 degrees.

Thus there has been described a new and improved satellite tracking system. The results of the simulations show that the tracking system using an exponential discount factor of 0.94, optimized for a 5 degree tilt angle, with a step size of 0.15 beamwidths, and a 30 dB-Hz carrier to noise ratio is able to track the motion of a satellite in a 5 degree inclined orbit to within an RMS error of 0.005 beamwidths and a peak error of 0.02 beamwidths. By contrast, prior art tracking systems using a search algorithm for the highest signal with a step size of 0.05 beamwidths has an RMS pointing error of 0.05 beamwidths and a peak error of 0.15 degrees.

Furthermore, the precision step-scan tracking system using the smoothing algorithm of the present invention is more robust than conventional step-track algorithms, when the downlink signal strength changes with time. For example, with a 2 percent RMS Gaussian amplitude modulation and with an exponential decorrelation time of 36 seconds, the precision step-scan tracking system tracked with an RMS error of 0.008 beamwidths and a peak error of 0.025 beamwidths. The prior art system using a step-scan search system had an RMS error of 0.085 beamwidths and a peak error of 0.21 beamwidths.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In a satellite tracking system having an antenna adapted to receive radio frequency signals from a moving satellite and having an antenna pointing mechanism that is adapted to point the antenna beam in the direction of maximum received signal strength in response to command signals, wherein the improvement comprises:
   a smoothing processor coupled to the pointing mechanism and to the antenna that comprises a Taylor series model of the motion of the satellite, the smoothing processor adapted to operate on existing conventional instantaneous error measurement data to arrive at an estimate of the coefficients of the Taylor series, and provide error correction output signals that are adapted to make incremental adjustments to the pointing direction of the antenna beam to point it toward the moving satellite.

2. The satellite tracking system of claim 1 which is adapted to execute a predefined sequential, discounted least mean square algorithm that utilizes the instantaneous error measurement data to recursively determine the coefficients of the Taylor series, the smoothing processor discounting old measurement data as new measurements are made.

3. The satellite tracking system of claim 2 wherein the predefined sequential, discounted least mean square algorithm is adapted to provide an exponentially discounted least mean square fit to the measured data.

4. In a satellite tracking system having an antenna adapted to receive radio frequency signals from a moving satellite and provide output signals indicative of the amplitude of the received signals, the tracking system having an antenna pointing mechanism coupled to the antenna that is adapted to point the antenna along a desired line of sight in response to command signals, the tracking system having a signal processor coupled to the antenna and pointing mechanism that is adapted to process the signals from the antenna to provide antenna pointing signals, wherein the improvement comprises:
   the signal processor comprising a smoothing processor coupled to the antenna pointing mechanism and to the antenna that is adapted to process instantaneous error measurement data in accordance with a sequential, discounted least mean square algorithm to generate the coefficients of a Taylor series model of the motion of the satellite, and provide error correction output signals that are adapted to incrementally adjust the pointing direction of the antenna to point it toward the moving satellite.

5. The satellite tracking system of claim 4 wherein the smoothing processor is adapted to provide error correction output signals that are combined with the command signals to incrementally adjust azimuth and elevation pointing angles of the antenna to maintain the center of the antenna pattern on the moving satellite.

6. The satellite tracking system of claim 5 in which the smoothing processor is adapted to execute a predefined sequential, discounted least mean square algorithm that utilizes the instantaneous error measurement data to recursively determine the coefficients of the Taylor series, the smoothing processor discounting old measurement data as new measurements are made.

7. The satellite tracking system of claim 6 wherein the predefined sequential, discounted least mean square algorithm is adapted to provide an exponentially discounted least mean square fit to the measured data.

8. A method of controlling the pointing of an antenna toward a moving satellite, said method comprising the steps of:
   establishing a Taylor series mathematical model of the motion of the satellite;
   iteratively processing a series of antenna pointing direction error measurements to recursively determine the coefficients of the Taylor series, which coefficients represent the angular position, angular velocity, and angular acceleration of the satellite;
   generating error correction signals that are adapted to adjust the pointing direction of the antenna to maintain the center of its beam pattern on the moving satellite; and
   controlling the pointing direction of the antenna in accordance with the error correction signals.

9. The method of claim 8 which further comprises the step of:
   discounting old error measurements as new measurements are made.

10. The method of claim 9 wherein the step of discounting old error measurements comprises the step of::
    exponentially discounting old error measurements in accordance with a predetermined exponential discount rate as new measurements are made.

11. A method of pointing an antenna at a satellite comprising the following steps:
    making a sequence of measurements of signal amplitude transmitted by the satellite;
    establishing a Taylor series mathematical model of the motion of the satellite;

iteratively processing a series of antenna pointing direction error measurements that are indicative of the direction to the satellite to recursively determine the coefficients of the Taylor series;

computing incremental adjustments to the pointing direction of the antenna that are adapted to maintain the center of its beam pattern on the moving satellite in accordance with the processed error measurements; and incrementally adjusting the pointing direction of the antenna to aim it toward the satellite.

12. The method of claim 11 which further comprises the step of:
    discounting old error measurements as new measurements are made.

13. The method of claim 12 wherein the step of discounting old error measurements comprises the step of::
    exponentially discounting old error measurements in accordance with a predetermined exponential discount rate as new measurements are made.

* * * * *